Feb. 25, 1936.  W. C. ANDERSON  2,031,810

WALNUT HULLER

Filed Dec. 12, 1933  2 Sheets-Sheet 1

INVENTOR.
W. Chas. Anderson
BY
ATTORNEY

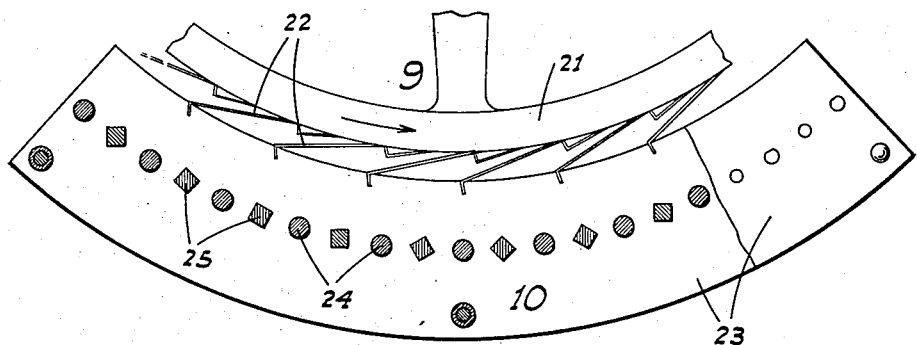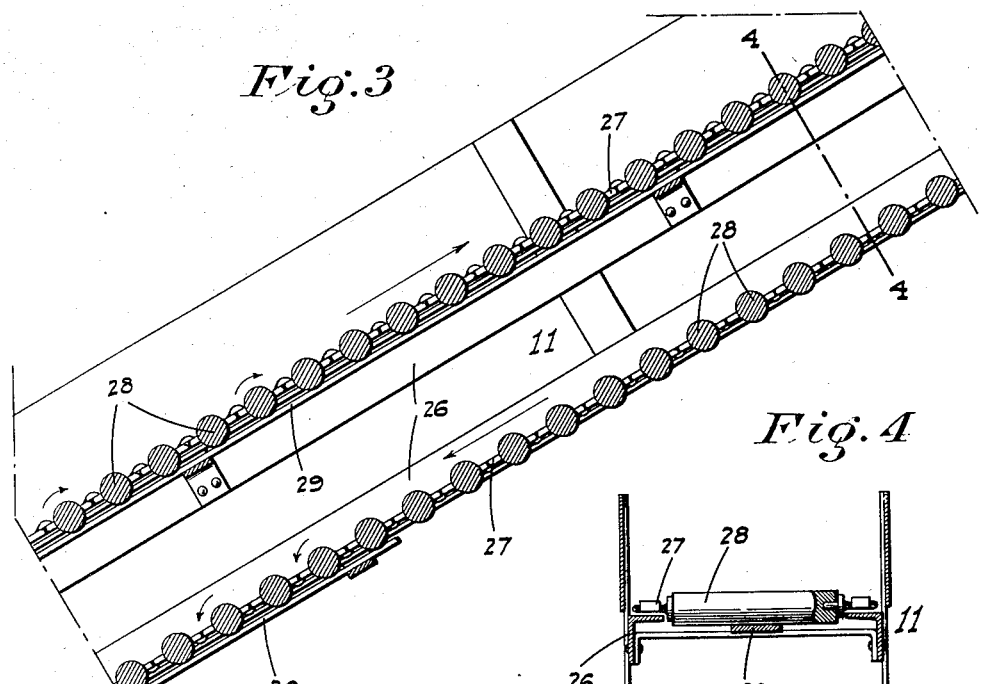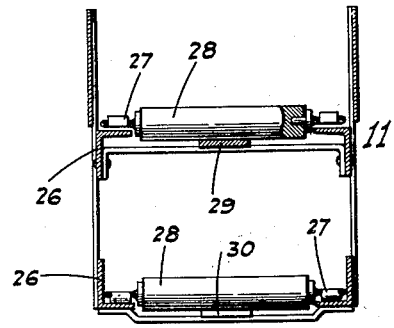

Patented Feb. 25, 1936

2,031,810

UNITED STATES PATENT OFFICE 2,031,810

WALNUT HULLER

W. Charles Anderson, Linden, Calif., assignor to Anderson Orchard Company, Linden, Calif., a corporation of California Application December 12, 1933, Serial No. 701,998

4 Claims. (Cl. 146—8)

This invention relates to nut hulling machines, and particularly to one for hulling walnuts. One object of my invention is to provide what I believe to be a novel method of harvesting and hulling such nuts, and a machine for carrying out the method, constructed as a self-contained portable unit.

This machine is designed to be pulled along the ground by an open body power truck or the like, and is provided with a hopper for receiving the nuts as gathered from the ground by workers following or walking alongside the machine. The nuts discharged into the hopper are automatically conveyed to the hulling mechanism, leaves and the like are separated therefrom, and the hulled nuts are delivered to the truck body while the hulls are deposited on the ground in the wake of the machine.

In this manner I conserve time, labor and operating space incident to hulling operations, since such operations are all done in the field and the necessity of gathering and hauling the bulky unhulled nuts to a central plant, dumping them for subsequent hulling, and afterwards hauling the hulls away, is avoided. Also the hulls themselves have a certain mulch value, which I make use of in carrying out my method by means of the above machine.

A further object of the invention is to provide a form of concave, cooperating with the hulling reel of the machine, which while the same in principle as shown in Patent No. 1,913,581 to William C. Anderson, has considerable improvement thereover in that the concave is self-cleaning and there is little if any tendency for it to clog up with the hulls or with small defective nuts.

Still another object of the invention is to provide a combination nut and hull elevator and hull separator, arranged so that as the nuts are conveyed from the hulling mechanism the hulls will be automatically separated from the nuts and discharged from the elevator so that they will not be dropped into the truck body along with the nuts.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged longitudinal section of one of the concave segments.

Figure 3 is a fragmentary longitudinal section of the combination elevator and hull separator.

Figure 4 is a cross section of the same on the line 4—4 of Figure 3.

Figure 1:
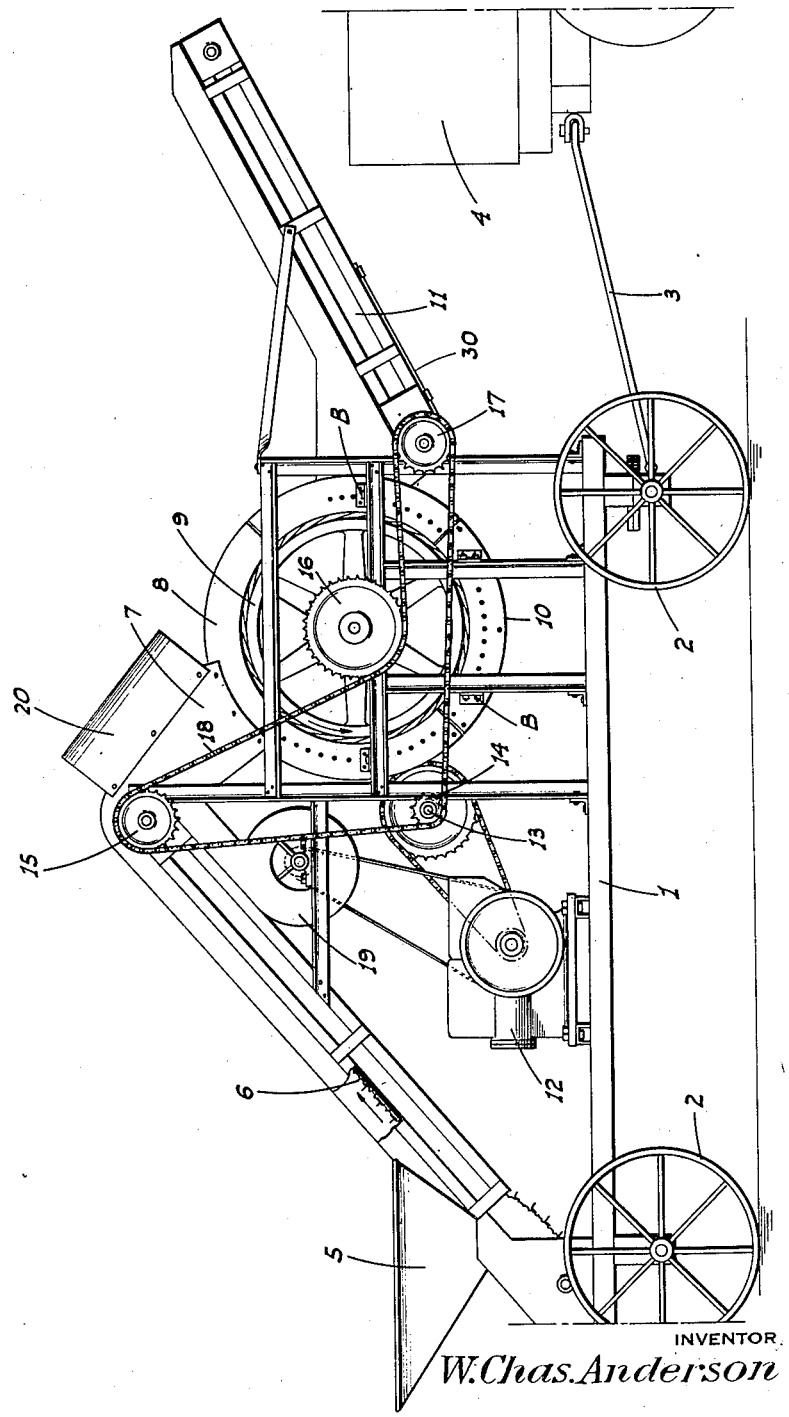
Figure 1 is a side elevation of the machine.

Referring now more particularly to the characters of reference on the drawings, the machine comprises a suitable rigid framework 1 supported on front and rear pairs of wheels 2, the front pair of which are steerable and connected to a tongue 3 by which the frame may be connected to and hauled by a bodied power truck, indicated at 4.

Mounted on the frame at its rear end or at the end opposite the steerable wheels is a hopper 5 disposed at a level convenient to workers standing on the ground, and which delivers to an elevator 6 of any suitable character also mounted on the frame. The elevator extends upwardly and forwardly from the hopper and discharges into an open chute 7 which is connected to a casing 8 which extends about the upper portion of the reel 9, which is turnably mounted on the frame 1. The reel cooperates with the concave 10, these parts together forming the hulling mechanism, which will be described in detail later. A combination elevator and separator, denoted generally at 11, receives from the hulling mechanism and extends upwardly and rearwardly beyond the frame so as to overhang the truck body, as shown in Figure 1.

The elevator and reel are driven from a power plant, such as a gas engine 12 mounted on the framework 1. This is preferably done by means of a countershaft 13 driven directly by the gas engine. The shaft 13, the upper shaft of the elevator 6, the reel 9, and the lower shaft of the elevator 11 are provided at one end with sprocket wheels 14, 15, 16, and 17 respectively, all engaged by a single drive chain 18 in such a manner that the upper runs of the elevator travel in the proper direction while the upper surface of the reel turns toward the elevator 6.

The engine also drives a blower 19 mounted under the upper portion of the elevator 6 and directs a blast upwardly into the adjacent portion of the chute 7, or just where the elevator discharges into said chute. The chute on one side is provided with a longitudinally extending and upwardly projecting deflector plate 20 arranged so that air striking the same will be deflected laterally and any leaves etc. in the air stream will be thrown off to one side of the chute where they can drop to the ground.

The reel 9 comprises a cylinder 21 on which spring hulling fingers 22 are mounted. These fingers project tangentially from the cylinder away from its direction of rotation and are of the same construction as shown in the aforementioned patent. The concave comprises side plates 23 disposed concentric with and outwardly of the cylinder to the sides of the same and made in segments separate from each other. There are preferably three such segments—one at the bottom and one on each side extending to a junction with the casing 8, which is somewhat above the horizontal axis of the reel cylinder. Round bars 24 extend between the plates in concentric relation to the reel and are rigidly fixed in said plate. Centrally between the round bars, square bars 25 are turnably mounted in the plates, said bars 25 being on the same circular line as the bars 24. While I have here shown the bars 24 as being round, other similar shapes may be employed instead. Also, while I have shown the bars 25 as being square, other polygonal sided forms may be used as long as they have sharp edges which are further from the axis of the said bars than the sides of the bars themselves. Also, while I have shown the different bars as being arranged in alternating relation to each other, I wish it understood that I may rearrange the relationship of the turnable and stationary bars if necessary or desirable.

The result of this arrangement is that as the reel rotates and the nuts are hulled by the cooperating action of the fingers and bars, the hulls are swept around the concave and are pressed against the corners of the rotatable bars, causing the latter to rotate and the hulls to drop clear of said bars. This is because with such rotation the space between the adjacent bars sooner or later is increased, causing the free discharge of the hulls, and preventing any wedging of the hulls between the bars as was sometimes found to be the case with the all rigid bars of the previous device. The various segments of the concave are connected by adjustable brackets B to the adjacent frame members so that said segments can be separately adjusted toward or from the reel to alter the hulling space as the size of the nuts may demand.

The elevator 11 comprises transversely spaced pairs of vertically spaced rails 26 constituting a rigid frame and rigidly supported from the framework 1 of the machine in any suitable manner. The elevator itself comprises a pair of transversely spaced endless chains 27, the upper and lower runs of which are closely superimposed on the corresponding upper and lower frame rails. Freely turnable rollers 28 extend between and are supported by the chains in evenly spaced relation, and constitute the nut supporting surface of the elevator, being so spaced as to prevent nuts of any marketable size falling therebetween.

The rollers of the upper run of the elevator conveyor rest on a rail 29 mounted in rigid connection with the elevator frame so that as the chains move lengthwise the rollers will turn. The rollers of the lower run of the elevator may also ride on a similar rail 30 which however only extends along the lower portion of the elevator.

As a result of this arrangement such hulls as are not discharged from the concave and are carried onto the elevator are positively discharged between the rollers of the upper run of the conveyor. Without the rotatable rollers the hulls are apt to span the rollers and fail to be discharged, but being of lesser thickness than the spacing between the rollers they will readily discharge when such hulls are turned on edge as is positively done by the rotation of the rollers. Practically all the hulls drop between the rollers of the upper run of the conveyor along the lower portion thereof and fall onto the adjacent rollers of the lower run, which also rotating, cause said hulls to drop through and onto the ground. This prevents the possible clogging of the lower portion of the lower run of the elevator with the hulls.

Any hulls which do not drop between the upper rollers until adjacent the upper end of the elevator are caught by the adjacent rollers of the lower run which having no rotation, and traveling down, tend to carry such hulls down without discharging them until rotation is imparted to such rollers by the rail 30. This is advantageous since it tends to prevent any hulls dropping into the truck body with the nuts.

In operation the workers having knocked the nuts down from the trees gather the nuts up and dump them into the hopper, the machine moving slowly along the orchard as the gathering operations are proceeded with. With the movement of the machine, or regardless of such movement, the hulling operations, the dropping of the hulls onto the ground, and the discharge of the hulled nuts into the truck body proceed automatically. Thus, by the time the orchard or a predetermined portion of the same has been traversed by the machine traveling in the general direction of the hulling and bleaching plant, all the nuts in the traversed area have been gathered up and hulled by the time or before the machine reaches said plant.

While I have here shown and described and preferably use a power truck for hauling the machine, this is not actually essential to the carrying out of the method. In other words, draft animals or the like may be connected to the hopper end of the machine to pull it in that direction, and a bodied trailer may be hooked onto the tongue 3 to receive the hulled nuts from the elevator 11.

One of the important features of my improved huller, and by reason of which it is well adapted for portable field use, is the entire combination in a single wheeled unit, of the receiving hopper 5, the delivery elevator 6, the blower 19 at the discharge end of the delivery conveyor, the huller concave 10, and the combination elevator and hull separator 11 leading from the concave.

These combined parts function in toto to effectively handle the nuts from tree to truck. The nuts, which in the usual practice of harvesting are knocked from the trees, will unavoidably have leaves and small twigs intermingled therewith. In the use of a portable field huller such as mine is designed to be, and which will receive the nuts directly as harvested, these leaves and small twigs, unless previously disposed of, would be dumped into the hopper with the nuts. They would then be delivered by the elevator 6 into the concave where they would tend to clog up and seriously interfere with the successful operation of the hulling mechanism. Therefore I have provided the blower 19 interposed at a point between delivery from the elevator and the concave where complete disposal of these leaves and twigs is accomplished before the nuts reach the concave, so that the hulling mechanism can function at highest efficiency on the hulls without any interference. Then the separator 11 completes the final separation of scattered hulls so that only clean well hulled nuts are finally delivered into the truck 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A nut huller comprising a rotatable hulling reel, a cooperating concave including spaced bars arranged in a row substantially concentric with the reel and parallel to its axis; certain ones only of such bars being freely turnable, and the turnable bars being of such cross sectional form as to have longitudinal edges further from the axis of rotation than the sides of the bars.

2. A nut huller comprising a rotatable hulling reel, a cooperating concave including spaced bars arranged in a row substantially concentric with the reel and parallel to its axis, alternate ones only of said bars being freely turnable.

3. A nut huller comprising a rotatable hulling reel, and a cooperating concave including spaced bars arranged in a row substantially concentric with the reel and parallel to its axis; certain ones only of such bars being freely turnable, and such turnable bars being square in cross section.

4. A nut huller comprising a rotatable hulling reel, and a cooperating concave including spaced bars arranged in a row substantially concentric with the reel and parallel to its axis; certain ones only of such bars being freely turnable, and such turnable bars being square in cross section while the remaining bars are round.

W. CHARLES ANDERSON.